April 22, 1952
S. S. DI MAGGIO, JR
2,594,136
PRESSURE OPERATED INDICATING APPARATUS
Filed Aug. 8, 1950
4 Sheets-Sheet 1
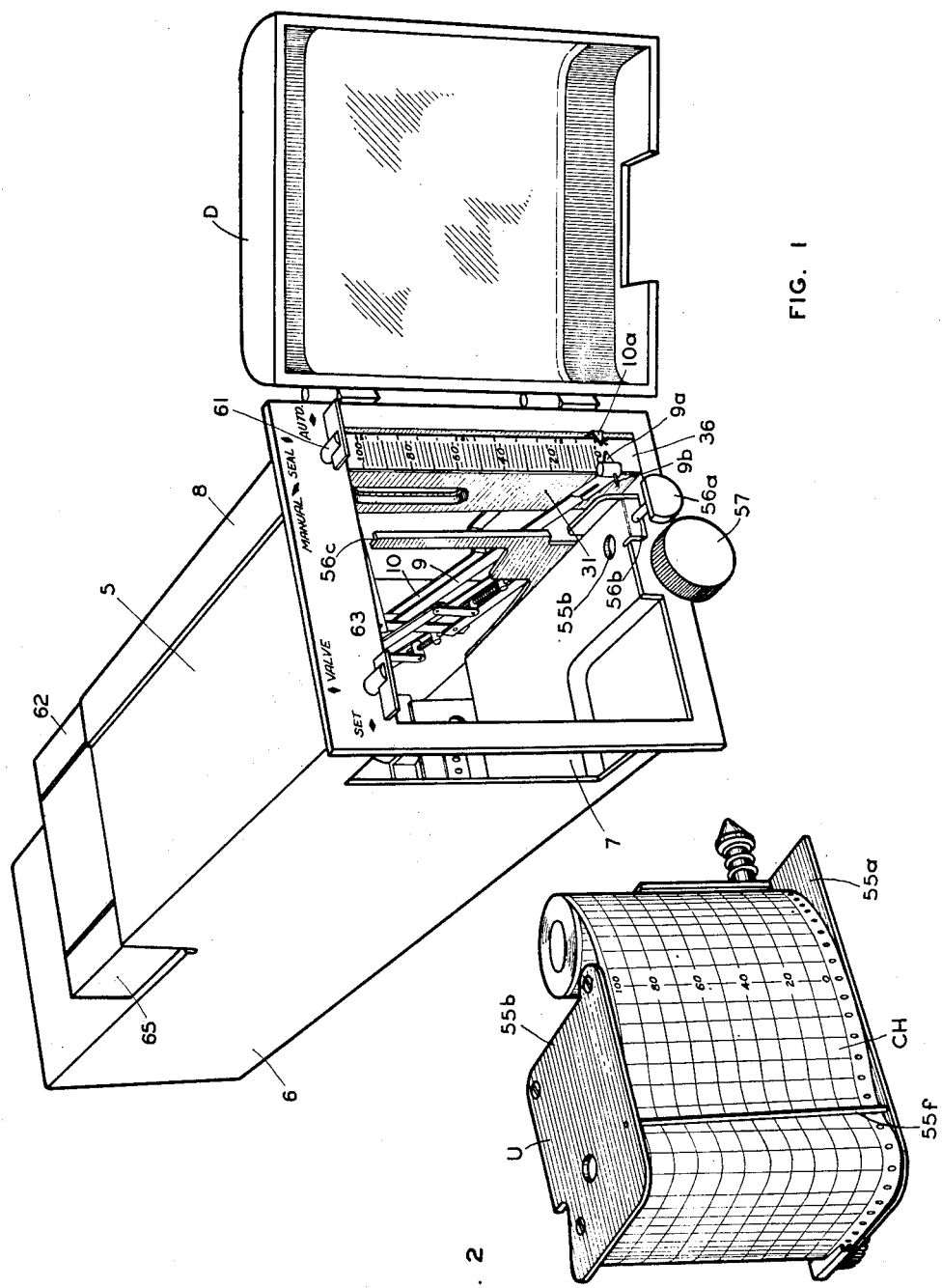
*INVENTOR.*
S.S. DIMAGGIO JR.
BY
*D. Clyde Jones*
ATTORNEY April 22, 1952  S. S. DI MAGGIO, JR  2,594,136
PRESSURE OPERATED INDICATING APPARATUS Filed Aug. 8, 1950  4 Sheets-Sheet 2

INVENTOR.
S.S. DIMAGGIO JR.
BY
*D. Clyde Jones*
ATTORNEY

April 22, 1952 S. S. DI MAGGIO, JR 2,594,136
PRESSURE OPERATED INDICATING APPARATUS
Filed Aug. 8, 1950 4 Sheets-Sheet 3
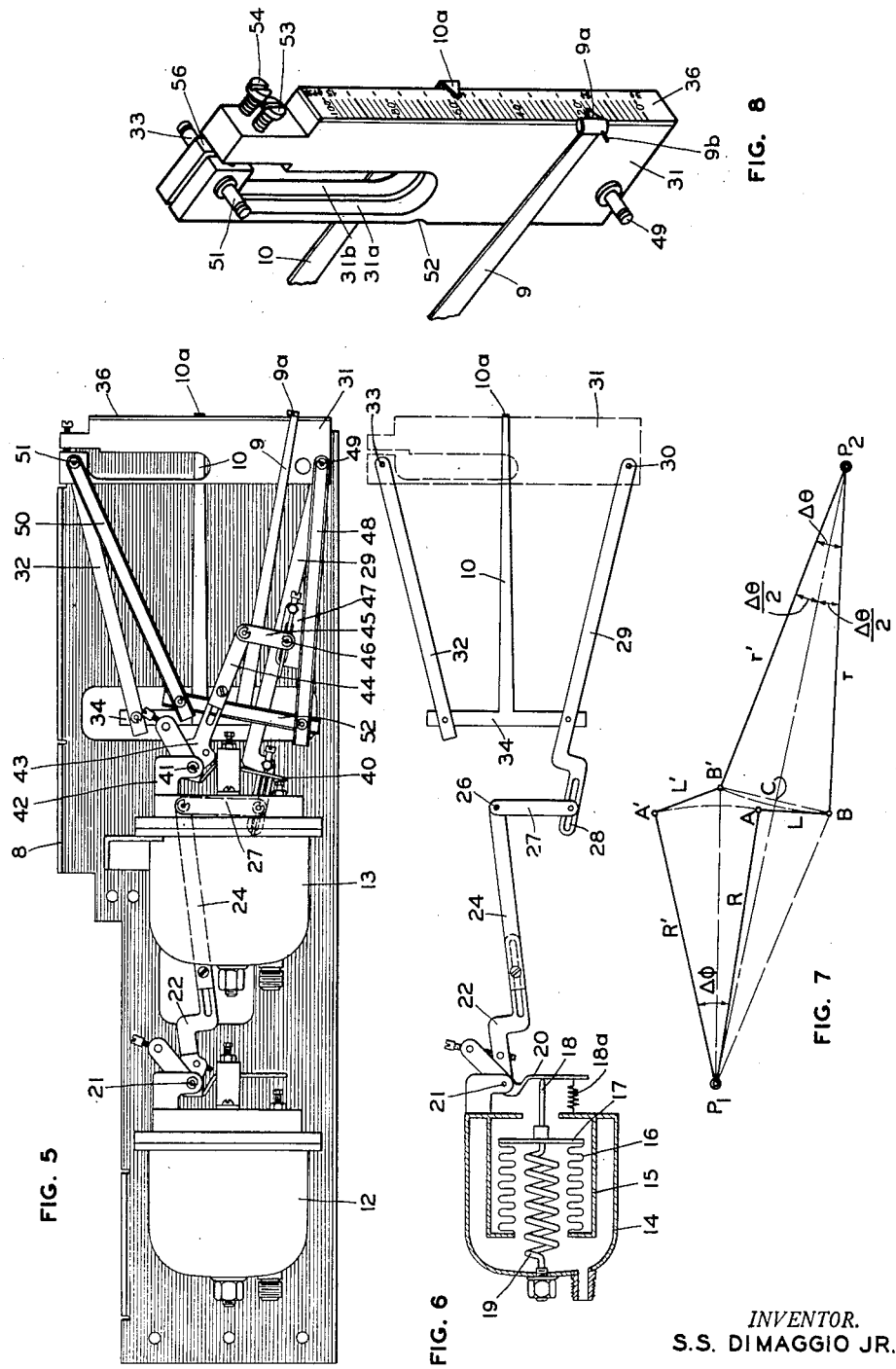
INVENTOR.
S.S. DI MAGGIO JR.
BY
D. Clyde Jones
ATTORNEY April 22, 1952     S. S. DI MAGGIO, JR     2,594,136
PRESSURE OPERATED INDICATING APPARATUS
Filed Aug. 8, 1950     4 Sheets-Sheet 4
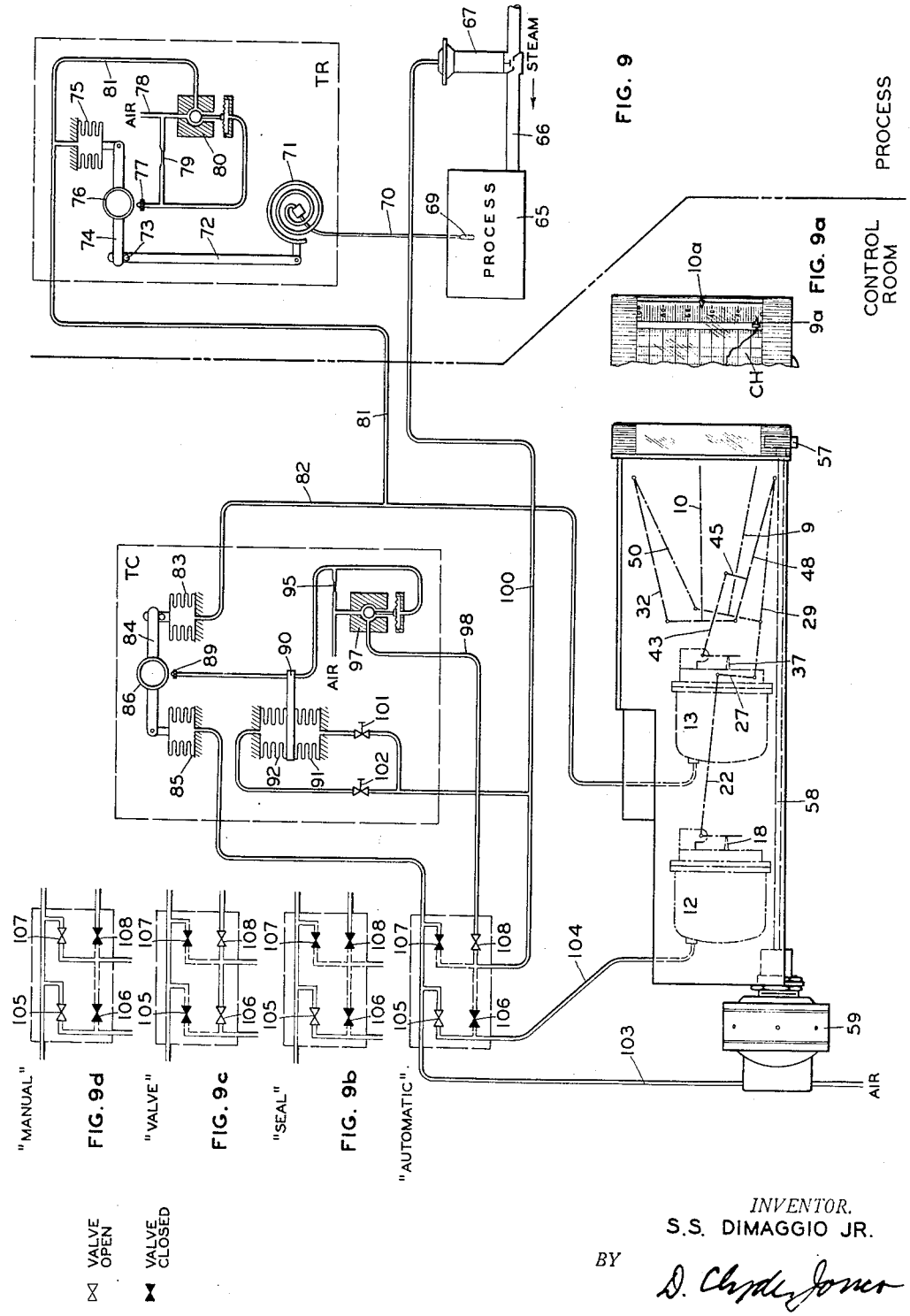
*INVENTOR.*
S.S. DIMAGGIO JR.
BY
D. Clyde Jones
ATTORNEY Patented Apr. 22, 1952

2,594,136

UNITED STATES PATENT OFFICE 2,594,136

PRESSURE OPERATED INDICATING APPARATUS

Samuel S. Di Maggio, Jr., Rochester, N. Y., assignor to Taylor Instrument Companies, Rochester, N. Y., a corporation of New York Application August 8, 1950, Serial No. 178,278

6 Claims. (Cl. 73—410)

This invention relates to a pressure-operated indicating apparatus for use in operating a pneumatic control and recording system.

The various features and advantages of the invention will appear from the detailed description and claims when taken with the drawings in which:

Fig. 1 is a perspective view of the apparatus of this invention with the chart unit thereof removed;

Fig. 2 is a perspective view of the chart unit;

Fig. 5 is a side elevation of the apparatus with the case and the chart unit thereof omitted, showing especially the motors and linkages for operating the set-point arm and the stylus arm with respect to the graduated scale;

Fig. 6 is a side elevation of the set point arm with the linkage and motor for operating it;

Fig. 7 is a diagram useful in explaining the linkage;

Fig. 8 is a perspective view of the scale block with the graduated scale thereon;

Fig. 9 is a diagrammatic view of a pneumatically operated control system incorporating the present invention;

Fig. 9a is a fragmentary front of the present invention particularly showing the relation of the chart and scale plate and Figs. 9b, 9c and 9d illustrate several possible adjustments of the manually operated valves employed in the system of Fig. 9.

Figure 3:
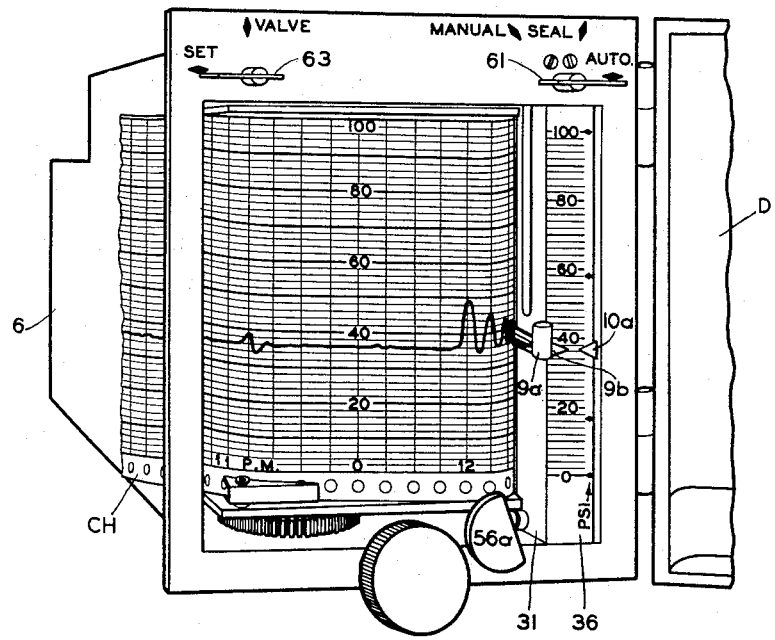
Fig. 3 is a perspective view of the apparatus with the chart unit mounted therein.

A combined recorder, indicator and controller using present invention includes a rectangular case closed at its rear end but open at its front end to receive a removable recording unit U which closes the front of the case during use. The case comprises a top 5, a side 6 and a bottom 7 preferably made from a single piece of sheet material. The front of the case is closed by a transparent door D. The other side 8 of the case is removable and constitutes a support on which the pen arm 9 with its actuating mechanism as well as the set pointer 10 with its actuating mechanism and the related, graduated scale (to be described), are mounted. This enables the pen and set pointer with their respective actuating mechanisms to be assembled and calibrated on the side 8 apart from the case proper, after which this side with its assembled and calibrated mechanisms thereon, is attached to the remainder of the case to complete the fourth side thereof. The support side 8 has mounted thereon two pneumatic motors 12 and 13, the motor 12 being operated by air under selected pressures corresponding to the desired set-point or value at which the variable is to be maintained. The motor 13 is operated by air under pressure proportional to changes sensed in a variable condition at a remote point, to be recorded and controlled from the central panel where the present device is located. The pneumatic motor 12 comprises a rigid cup-like shell 14 having a reentrant portion 15 to which one end of a bellows 16 is sealed. The other end of this bellows is sealed to a movable bellows plate 17. The outer surface of the plate 17 carries a projecting pin 18 which actuates a set pointer linkage to be described. The inner surface of the bellows plate 17 is connected to the inner surface of the shell by an adjustable spring 19 whereby the initial tension of the bellows can be adjusted at will. The pin 18 is held by spring 18a in contact with the arm 20 of a bell crank lever pivoted at 21 on a bracket carried on the shell 14. The other arm 22 of the bell crank lever is slotted lengthwise for adjustable connection to the take-off link 24 whereby the linearity of the set-pointer 10 (i. e. proportional relation between movement of the set-pointer and the air pressure in its motor 12), can be changed at will. The arms 20 and 22 of the bell crank lever are preferably angularly adjustable with respect to each other around pivot 21 by means of a micrometer screw. The free end of the take-off link 24 is pivoted at 26 to one end of the connecting link 27. The other end of the link 27 is adjustably connected in the longitudinal slot 28 in one end of the bar 29 of a multi-bar linkage arrangement. This adjustable connection enables the span of the set pointer to be changed at will. The other end of bar 29 is pivoted at 30 on the outer surface of the lower end of the pivot block 31 (Fig. 5). This block is secured to the side support 8 in spaced relation thereto, as by screws (not shown), at its upper and lower ends. The linkage also includes a bar 32 which is pivoted at its front end on pivot 33 carried by the upper outer surface of block 31 (Fig. 5). The other end of bar 32 is connected by a cross-bar 34 to an intermediate point on the bar 29. The cross-bar 34 at its mid-point has the integral set pointer 10 projecting at right angles thereto, to extend along block 31. The construction of the multi-bar linkage is such that the end 10a of the set pointer moves in substantially a straight path along the straight graduated scale 36 on the front face of the pivot block 31. The right side of scale 36 shows the actual process range of the transmitter, such as degrees temperature and is also graduated from 3 to 15 pounds per square inch for noting the position of the process controlling diaphragm valve and for checking calibration.

The pneumatic motor 13 is identical in construction with the bellows 12 and need not be further described. A pin 37 (Fig. 9) carried by a bellows (not shown) in the motor 13, actuates a second multi-bar linkage to advance the pen arm 9 and its pointer 9a and its pen or stylus 9b in a substantially straight path along the scale 36. In this second linkage the pin 37 (Fig. 9) actuated by the bellows of motor 13, engages an arm 40 of a bell crank lever which is pivoted at 41 on a bracket 42 carried by the shell of motor 13. The arm 43 of the bell crank lever has adjustably mounted thereon a slotted take-off arm 44. The free end of arm 44 has pivoted thereon one end of a link 45. The other end of this link is connected to the pivot 46 which is adjustably mounted in a slot in the bracket 47 integral with the bar 48 of a multi-bar linkage similar to that previously described. The front end of bar 48 is pivoted at 49 on the lower inside surface (Fig. 5) of pivot block 31. A second bar 50 has its front end pivoted at 51 on the upper inside surface of the pivot block 31. The rear ends of bars 48 and 50 are linked together by a cross-bar 52. This crossbar, at its mid-point carries a pen arm 9 which extends to the scale 36 where it terminates in an index 9a and in a stylus 9b. It will be noted that the upper part of the pivot block 31 has a deep cutout 56 extending transversely of block 31. A kerf in the main plane of the block extends into the cut-out thereby providing two spring-like parts 31a and 31b on which the pivots 51 and 33 are carried. The spring-like parts 31a and 31b are each pre-stressed by hitting at a point such as 52 so that they tend to spring toward the main body of the block 31. Screws 53 and 54 screwed into the block, adjust the respective spacing between the block proper and the parts 31a and 31b. By this construction the pivot pins 30 and 33 can be brought into desired vertical alinement so that the set pointer will register with the zero graduation on scale 36. Likewise the pivot pins 49 and 51 can be brought into desired vertical alinement so that the pointer 9a and stylus 9b will register with the zero graduation on the scale 36 and on chart CH.

As illustrated in Fig. 7, the line $P_1P_2$ between the centers 21 and 30 bisects one of the angular motions in the linkage whereby separate span adjustments, namely the range from 0 to 100 and the linearity adjustment to give substantially linear travel of the stylus and also of the set pointer can be independently effected. Thus, the calibration is greatly simplified since the linearity adjustment does not affect the span adjustment. This linkage arrangement forms the subject matter of a copending application of Nathaniel D. Nichols, Serial 229,047 filed May 31, 1951, but is herein included to afford a better understanding of the present invention. The reason for the effectiveness of the present linkage arrangement will be understood from the following explanation:

$P_1$—fixed pivot 21 of bellows take-off arm
$\Delta\phi$—change in angle of bellows take-off arm
A—pivot 26 of connecting link on bellows take-off arm
Arc AA'—trajectory of pivot A as take-off arm rotates
R—bellows take-off arm radius
L—connecting length of connecting link 27
$P_2$—fixed pivot 30 of the multi-bar linkage
$\Delta\theta$—angular input motion to the multi-bar linkage
B—pivot of connecting link on the multi-bar linkage
Arc BB'—trajectory of pivot B as multi-bar linkage rotates $r=BP_2$
$P_1B$ and $P_1B'$ are construction lines.
C is the point of intersection of $P_1P_2$ and BB'.
Letters without primes indicate positions at 0% of range.
Letters with primes indicate position at 100% of range.

Unless otherwise indicated, juxtaposition of letters indicating the various pivots and positions denotes the length of the straight line between them.

The ratio of $$\frac{\Delta\phi}{\Delta\theta}$$

is independent of R as shown below.
Since BB' is bisected by $P_2P_2$ $$P_1B=P_1B'$$
$$L=AB=A'B'$$
$$R=P_1A=P_1A'$$

for any value of R. Consequently for any values of R, triangle $P_1AB$=triangle$P_1A'B'$
Consequently Angle $BP_1B' = \Delta\phi$, and Angle $CP_1B' = \dfrac{\Delta\phi}{2}$ $$\tan\frac{\Delta\phi}{2}=\frac{BC}{P_1C}=\frac{r\sin\Delta\theta/2}{P_1P_2-r\cos\Delta\theta/2}$$

and $\dfrac{\Delta\phi}{\Delta\theta}=\dfrac{2\arctan\left(\dfrac{r\sin\Delta\theta/2}{P_1P_2-r\cos\Delta\theta/2}\right)}{\Delta\theta}$ which is independent of R. Therefore, for a given $\Delta\theta$ and $P_1P_2$, adjustment for variations in $\Delta\phi$ of the receiver units are made by adjusting $r$.

Subsequently R can be adjusted, for the purpose of correcting for non-linearity errors, without effecting the ratio of $\Delta\phi/\Delta\theta$. (In the words of an instrument calibrater, the span is independent of the linearity adjustment.)

Figure 4:
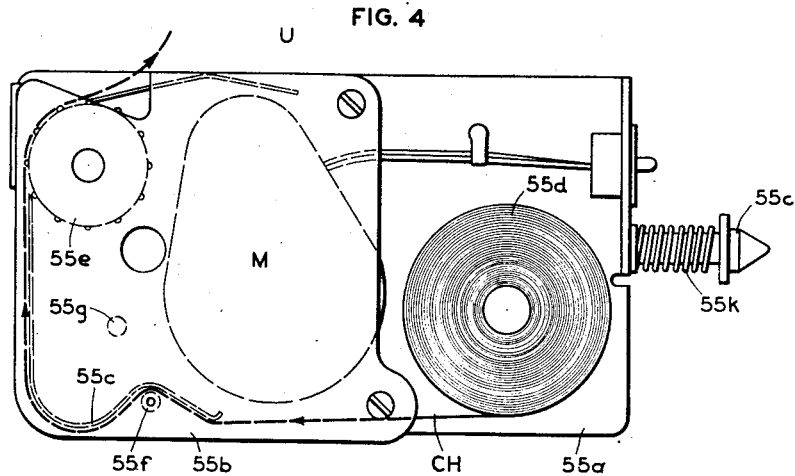
Fig. 4 is a top view of the chart unit.

The recording unit U, best shown in Figs. 2 and 4, comprises a base plate 55a and a top plate 55b suitably held in spaced relation with a chart plate 55c spanning the front and a portion of the right side (Fig. 3) of the unit. The chart plate provides a support for the back of the chart CH as it is drawn from the chart supply roll 55d by the chart drive cylinder 55e. This cylinder, which is driven through suitable gears (not shown) by the motor M, is provided with driving pins to engage the perforations in the lower margin of the chart. In order to insure that the horizontal lines on the chart will register with the corresponding graduations on the scale, the chart is always forced against the top surface of the base plate 55a. It has been found that this can be brought about preferably by providing a fixed rod or roller 55f journalled in the top and base plates to engage the outer surface of the chart. The upper end of roller 55f is tilted slightly from the vertical toward the plane of the upper margin of the chart. The recording unit can be retained in the case in any suitable manner but as herein shown the bottom of the base plate 55a is provided with a lug 55g to be sprung into the opening 55b in the bottom of the case (Fig. 1), the recording unit being normally biased downward by a spring (not shown) mounted on the inner surface of the top of the case. The rear of the unit U has a pointed guide pin 55c surrounded by an ejecting spring 55k. The guide enters a guide opening (not shown) in a part of the case, and the spring 55k which is compressed when the unit is inserted in the case, tends to eject the unit when the positioning dowel 55g is disengaged from the opening 55b.

At the lower part of the front of the case, there is provided a knob 56a on a shaft 56b which carries a cam (not shown). This cam, cooperates with a leaf spring 56c mounted on the bottom of the case to extend upward adjacent the pen arm 9. It will be noted that the knob 56a has a slabbed side which prevents the removal of the recording unit U (Fig. 3) until this knob is rotated to the position shown in Fig. 1. In this position, the cam on shaft 56b forces a flexibly mounted arm 56c outward thereby moving the pen arm 9 to the right. This movement of the pen arm withdraws the pen or stylus 9a from the chart. This construction affords a mechanical interlock to insure that the stylus is shifted to the right before the recording unit is inserted or removed from the case.

The bottom of the front of the case is provided with a knob 57 (Fig. 1) carried on the adjusting stem 58 (Fig. 9) of a pressure reducing valve 59. This valve is mounted at the rear end of the case so that the adjusting stem extends under the bottom of the case.

At the right portion of the top of the front of the case (Fig. 1), there is provided the handle 61 mounted on the adjusting shaft of a three-position pneumatic valve unit 62. Means (not shown) having a detent effect, retains the handle in any one of the three possible positions "manual," "seal," and "auto" (automatic), to which it can be manually adjusted.

At the upper left portion of the top of the front of the case, there is also provided a handle 63 mounted on the adjusting shaft 64 of a two-position valve unit 65 namely "set" and "valve." The shaft 64 is spring biased so that the handle 63 must be manually held in the position designated "valve" but is automatically returned to its "set" position when released.

The operation of the recording, indicating and controlling instrument using the present invention will best be understood by reference to Fig. 9 which diagrammatically illustrates a controlling and indicating system incorporating this instrument. The present instrument is adapted for use in several different types of systems for controlling several different variables such as temperature, pressure, liquid level, rate of flow and the like, but it is herein illustrated as embodied in one form of temperature controlling system.

*Temperature controlling*

In this embodiment, the system includes the present instrument together with certain controlling equipment TC located on or adjacent a control panel at a central instrument room while the process with certain transmitting equipment TR is located at a point remote thereto adjacent a remotely located process. The process is herein shown as comprising a tank 65 containing material to be maintained at a desired set point or control temperature, by steam supplied to the tank through a pipe 66 under the control of a motor diaphragm valve 67, adapted to be operated by compressed air or the like. The temperature of the material is preferably sensed by a thermal or tube system having a bulb 69 projecting into the material and communicating through a capillary tube 70 with a Bourdon spring 71 of a temperature transmitter TR, the tube system being filled with a thermosensitive medium. The free end of the Bourdon spring 71 operates a link 72, the upper end of which carries a horizontally projecting pin 73. The free end of a baffle lever 74 which is pivoted on the lower or movable end of bellows 75, rests on the pin 73. The intermediate portion of lever 74 carries a baffle 76 in cooperative relation with nozzle 77 to constitute a pneumatic couple. Compressed air at a uniform pressure is supplied from pipe 78 through a restriction 79 to the nozzle 77 where it escapes under the control of the baffle 76. As the baffle approaches or recedes from the nozzle a slight amount, the back pressure in the nozzle will vary accordingly. The relay valve 80 will respond to this changing back pressure and will operate accordingly to vary the output pressure in pipe 81. This varying pressure in pipe 81 actuates the bellows 75 to move the baffle lever 74 of the transmitter in a direction to reduce the amount of the movement of the baffle due to the temperature change, thereby causing the pressure in pipe 81 to be proportional, over a useful span, to the temperature deviation as sensed at the bulb 69. The pressure in pipe 81 is communicated to the motor 13 of the instrument on the panel at the central point. This motor responds to this pressure to operate the bar linkage which moves the pen arm 9 with its pointer 9a and stylus 9b over the graduated scale 36 and the chart CH respectively to draw a time-temperature graph on this chart.

The pressure in pipe 81 is also communicated through branch pipe 82 to the fixed end of a measuring bellows 83 of a temperature controller TC at the central point. The movable end of this bellows which measures changes in the temperature at the bulb 69, positions the right end of the baffle lever 84. This lever is mounted at its left end on a pivot carried by the movable end of set point bellows 85. The intermediate part of baffle lever 84 is provided with a baffle 86 to cooperate with a nozzle 89. Nozzle 89, as herein illustrated, is carried by a bar 90 mounted on the movable ends of a pair of opposing bellows 91 and 92. Compressed air from a uniform source is supplied through a restriction 95 to the nozzle 89 where it escapes under the control of the baffle 86. As relative motion takes place between the baffle 86 and the nozzle 89, the back pressure at the nozzle changes accordingly, to actuate the relay valve 97 to vary correspondingly the output pressure of this relay valve. This output pressure is supplied through pipe 98, through selector valve 108 and pipe 100 to the diaphragm motor of valve 67 which controls the heat input or steam supplied to the tank 65. The pressure in pipe 98 is applied through needle valves 101 and 102 to bellows 91 and 92 respectively, where proportional and reset responses are desired. It will be understood that in obtaining these responses the needle valve 101 is so adjusted with respect to needle valve 102 that the bellows 91 responds to any change in pressure in pipe 98 before bellows 92 responds thereto. In accordance with the well known operation of bellows 91 and 92, bellows 91 first operates to reduce the change in space relation between the baffle 86 and the nozzle 89 due to any temperature change, and then the bellows 92 operates to cancel out this reduction. If the reset response is not desired the needle valve 102 can be closed completely and the bellows 92 omitted while if the proportional response is likewise not desired this needle valve 101 can also be completely closed and bellows 91 omitted. In this latter case, the left end of bar 90 is fixedly mounted.

The present system is so arranged that the set point or temperature at which the process is to be controlled, can be changed at will by adjusting the present mechanism on the panel at the central point. When a change in set point is desired, the reducing valve 59 can be adjusted by turning the knob 57 and the valve stem 58. As the reducing valve 59 is thus adjusted, the pressure in pipe 103 is changed accordingly so that the setpoint bellows 85 responds to move the left end of the baffle lever 84 so that the controller TC maintains the desired temperature in the process at a desired new value. The branch pipe 104 leading to the pneumatic motor 12 communicates through valve 105 with pipe 103 so that the output pressure of the reducing valve which adjusts the setpoint of the temperature controller TC, also actuates the set pointer arm 10 so that its set poiner 10a is positioned opposite a temperature graduation on scale 36, to indicate the new temperature being maintained by the controller TC.

*Change from automatic to manual control*

If for any reason it is desired to substitute manual control for automatic control, the right hand handle 61 (Fig. 1) is turned to "seal." In this position of these selector valves 105 to 108 diagrammatically indicated in Fig. 9b, valves 106, 107 and 108 are closed thereby locking the compressed air in the motor of diaphragm valve 67 so that neither the reducing valve 59 nor the controller TC will change the setting of diaphragm valve 67 which would undesirably upset the temperature of the process. Even in this setting of these selecting valves, the stylus 9a continues to record the process variable on the chart CH, the stylus being actuated by the air pressure in the pneumatic motor 13, which pressure is applied thereto through pipe 81 leading from the output of the relay valve 80 in the transmitter TR. With the right hand handle 61 in its "seal" position, the left hand handle 63 is now moved to the "valve" position whereby the valves 105 to 108 are in the position shown in Fig. 9c. The air pressure on the top of valve 67 is communicated through pipe 100, selector valve 106, pipe 104, to the pneumatic motor 12 which positions the set pointer opposite the appropriate graduation on the scale 36. This reading is in pounds per square inch.

The handle 63 is now released to its "set" or normal position. The knob 59 of the reducing valve is adjusted to apply air at such pressure through pipe 103, valve 105, pipe 104 to the pneumatic motor 12 until the set pointer 10a indicates the pressure in pounds per square inch that had previously been sealed on the top of valve 67. The handle 61 is then turned in its "manual" position whereby the selecting valves 105—109 are in the position shown in Fig. 9d. The knob 57 is now manually adjusted to control the valve 67 in such a manner that the process is maintained at any desired value as indicated by the pen arm pointer 9a. By the mentioned technique the control can be changed from automatic to manual control without upsetting the process during the change.

*Manual to automatic control*

When it is desired to change the system from manual to automatic control, the right hand handle 61 is adjusted to the "seal" position as in Fig. 9b. The knob 57 is turned to adjust the reducing valve 59 so that the pneumatic motor 12 positions the set pointer 10a opposite the position of the stylus 9f. When the pointer 10a and the stylus 9b are in registry on the scale 36, the handle 61 is positioned at "auto" whereby the system is on automatic control.

If it is desired to check the position of valve 67 or to check the controller operation when the system is operating under automatic control the handle 63 is turned to the position marked "valve."

What I claim is:

1. In a system for measuring a variable condition, means for sensing the changing values of the condition, mechanism proportionally actuated in response to the values sensed by said sensing means, a straight graduated scale plate fixedly mounted, a fixed pivot mounted adjacent each end of the scale plate at one side thereof, an exhibiting index arm having its front end cooperating with the graduations on said scale plate to exhibit sensed values of the variable, means including a linkage for moving the front end of the exhibiting index in a substantially rectilinear path along said scale plate, said linkage comprising a first link and a second link extending rearwardly from said scale plate, one end of the first link being pivoted on one of the fixed pivots and one end of the second link being pivoted on the other fixed pivot, a rigid member pivotally connecting the remaining ends of said first and second links, the rear end of said index arm being carried on said member at a point equidistant from its pivotal connections, and means including said mechanism for swinging one of said links about its fixed pivot.

2. In a system for measuring a variable condition, means for sensing the changing values of the condition, mechanism actuated by said sensing means and including a pipe for transmitting a fluid under pressures corresponding to the sensed values, a straight graduated scale plate mounted to extend in a vertical direction, a fixed pivot mounted adjacent each end of the scale plate at one side thereof, a proportionally responsive fluid motor communicating with said pipe for actuation by fluid under pressure transmitter therethrough, an exhibiting index arm having its front end cooperating with the graduations on said scale plate to exhibit sensed values of the variable, means including a linkage for moving the front end of the exhibiting index in a substantially rectilinear path along said scale plate for a distance corresponding to the pressure of the fluid applied to said motor, said linkage comprising a first link and a second link extending rearwardly from said scale plate, one end of the first link being pivoted on one of the fixed pivots and one end of the second link being pivoted on the other fixed pivot, a cross-bar pivotally connecting the remaining ends of said first and second links, the rear end of said index arm being carried on an intermediate portion of said cross-bar, and means including said motor for swinging one of said links about its fixed pivot.

3. In a system for measuring a variable condition, means for sensing the changing values of the condition, mechanism proportionally actuated in response to the values sensed by said sensing means, a straight graduated scale plate fixedly mounted, a fixed pivot mounted adjacent each end of the scale plate at one side thereof, an exhibiting index arm having its front end cooperating with the graduations on said scale plate to exhibit sensed values of the variable, means including a linkage for moving the front end of the exhibiting index in a substantially rectilinear path along said scale plate, said linkage comprising a first link and a second link extending rearwardly from said scale plate, the front end of the first link being pivoted on one of the fixed pivots and the front end of the second link being pivoted on the other fixed pivot, a cross-bar pivotally connecting the rear end portions of said first and second links, the rear end of said index arm being carried on an intermediate portion of said cross-bar, an actuating bar mounted adjacent one of its ends on a fixed pivot extending in a direction parallel to that of one of said fixed pivots, a third link pivotally connecting the remaining end of the actuating bar and the rear end of one of said first and second links, and means including said mechanism for swinging said actuating bar about its fixed pivot.

4. In a system for measuring a variable condition, means for sensing the changing values of the condition, mechanism actuated by said sensing means and including a pipe for transmitting a fluid under pressure corresponding to the sensed values, an elongated plate-like support, a straight graduated scale plate extending transversely of the support in a plane at right angles to the principal plane of the support, a fixed pivot mounted adjacent each end of the scale plate at one side thereof to extend in a direction parallel to the plane of said scale plate, a proportionally responsive fluid motor carried by said support and communicating with said pipe for actuation by fluid under pressure transmitted therethrough, an exhibiting index arm having its front end cooperating with the graduations on said scale plate to exhibit sensed values of the variable, means including a linkage for moving the front end of the exhibiting index in a substantially rectilinear path along said scale plate for a distance corresponding to the pressure of the fluid applied to said motor, said linkage comprising a first link and a second link extending rearwardly from said scale plate, one end of the first link being pivoted on one of the fixed pivots and one end of the second link being pivoted on the other fixed pivot, a cross-bar pivotally connecting the remaining ends of said first and second links, the rear end of said index arm being carried on an intermediate portion of said cross-bar, and means including said motor for swinging one of said links about its fixed pivot.

5. In a system for measuring a variable condition, means for sensing the changing values of the condition, mechanism actuated by said sensing means and including a pipe for transmitting a fluid under pressures corresponding to the sensed values, an elongated plate-like support, a straight graduated scale plate extending transversely of the support in a plane at right angles to the principal plane of the support, a fixed pivot mounted adjacent each end of the scale plate at one side thereof, a proportionally responsive fluid motor carried by said support and communicating with said pipe for actuation by fluid under pressure transmitted therethrough, an exhibiting index arm having its front end cooperating with the graduations on said scale plate to exhibit sensed values of the variable, means including a linkage for moving the front end of the exhibiting index in a substantially rectilinear path along said scale plate for a distance corresponding to the pressure of the fluid applied to said motor, said linkage comprising a first link and a second link extending rearwardly from said scale plate, the front end of the first link being pivoted on one of the fixed pivots and the front end of the second link being pivoted on the other fixed pivot, a member pivotally connecting the rear ends of said first and second links, the rear end of said index arm being carried on said member at a point equidistant from the pivotal connections thereof, the rear end of one of said links having a slot therein extending lengthwise thereof, an actuating bar pivotally mounted at one end on a fixed pin for rotary movement around said pin and proportionally moved by said motor, a third link pivotally connected at one of its ends to the other end of the actuating bar, the other end of the third link being pivotally and adjustably connected at selected points along the slot in the rear end of the slotted link.

6. In a system in accordance with claim 5 including means for changing the effective length of the actuating bar.

SAMUEL S. DI MAGGIO, Jr.

REFERENCES CITED

The following references are of record in the file of this patent:

UNITED STATES PATENTS

| Number | Name | Date |
|---|---|---|
| 829,368 | Clarke | Aug. 21, 1906 |
| 900,540 | Hilger | Oct. 6, 1908 |
| 1,080,109 | Hodge | Dec. 2, 1913 |
| 1,309,531 | McAdie | July 8, 1919 |
| 1,391,077 | Richter | Sept. 20, 1921 |
| 1,577,909 | Kath | Mar. 23, 1926 |
| 1,880,008 | Angus | Sept. 27, 1932 |
| 2,077,242 | La Pierre | Apr. 13, 1937 |
| 2,125,081 | Moore | July 26, 1938 |
| 2,202,286 | Gorrie | May 28, 1940 |
| 2,372,087 | Karassik | Mar. 20, 1945 |
| 2,442,586 | Clark | June 1, 1948 |
| 2,463,882 | Kent et al. | Mar. 8, 1949 |
| 2,527,207 | Barnes | Oct. 24, 1950 |
| 2,529,875 | Howard | Nov. 14, 1950 |
| 2,534,569 | Bowditch | Dec. 19, 1950 |

FOREIGN PATENTS

| Number | Country | Date |
|---|---|---|
| 437,843 | Germany | Nov. 30, 1926 |
| 370,257 | Great Britain | Apr. 7, 1932 |